United States Patent
Lin et al.

(10) Patent No.: US 11,562,129 B2
(45) Date of Patent: Jan. 24, 2023

(54) ADDING MACHINE UNDERSTANDING ON SPREADSHEETS DATA

(71) Applicant: Google LLC, Mountain View, CA (US)

(72) Inventors: Weihao Lin, New York, NY (US); Vishnu Sivaji, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/853,491

(22) Filed: Apr. 20, 2020

(65) Prior Publication Data

US 2021/0326519 A1    Oct. 21, 2021

(51) Int. Cl.
| | | |
|---|---|---|
| *G06F 40/18* | (2020.01) | |
| *G06N 20/00* | (2019.01) | |
| *G06F 16/901* | (2019.01) | |
| *G06F 40/169* | (2020.01) | |
| *G06F 40/30* | (2020.01) | |

(52) U.S. Cl.
CPC .......... *G06F 40/18* (2020.01); *G06F 16/9024* (2019.01); *G06F 40/169* (2020.01); *G06F 40/30* (2020.01); *G06N 20/00* (2019.01)

(58) Field of Classification Search
CPC ........ G06F 40/18; G06F 40/169; G06F 40/30; G06F 16/9024; G06N 20/00
See application file for complete search history.

(56) References Cited

U.S. PATENT DOCUMENTS

| | | | |
|---|---|---|---|
| 9,798,829 B1 | 10/2017 | Baisley | |
| 9,959,265 B1 * | 5/2018 | Vagell | G06F 16/3331 |
| 2008/0028340 A1 * | 1/2008 | Davis | G06F 40/106 |
| | | | 715/853 |
| 2009/0287673 A1 * | 11/2009 | Chronister | G06F 16/904 |
| | | | 707/999.005 |
| 2013/0097177 A1 | 4/2013 | Fan et al. | |
| 2017/0177559 A1 * | 6/2017 | Dang | G06Q 10/063 |
| 2018/0004722 A1 | 1/2018 | Naor | |
| 2018/0088753 A1 * | 3/2018 | Viégas | G06F 16/248 |
| 2018/0203836 A1 * | 7/2018 | Singh | G06F 40/18 |
| 2020/0104414 A1 * | 4/2020 | Filoti | G06N 5/00 |
| 2020/0250472 A1 * | 8/2020 | Abhyankar | G06K 9/6253 |

(Continued)

OTHER PUBLICATIONS

Alobaid, A. et al., "Knowledge-Graph-Based Semantic Labeling: Balancing Coverage and Specificity" IOS Press, Semantic-web-journal.net, downloaded Apr. 20, 2020 from https://scholar.google.com/scholar? hl=en&as_sdt=0,31&q=alobaid+knowledge-graph-based+semantic+labeling.

(Continued)

*Primary Examiner* — Stephen S Hong
*Assistant Examiner* — Nicholas Hasty
(74) *Attorney, Agent, or Firm* — Lowenstein Sandler LLP

(57) ABSTRACT

A method to generated a chart recommendation based on machine understanding of spreadsheet data, including determining a set of data that each include content of a cell of one or more cells in a column of a spreadsheet presented to a user. The method further determines an entity type associated with the column based on the set of data. The entity type represents a semantic meaning of the set of data in the column of the spreadsheet. The method further identifies at least one of a plurality of charts that is relevant to the entity type associated with the column. The method then provides the identified chart for presentation to the user.

26 Claims, 6 Drawing Sheets

(56) References Cited

U.S. PATENT DOCUMENTS

2020/0252281 A1* 8/2020 Abhyankar ........... G06F 16/217
2020/0372077 A1* 11/2020 Religa ................. G06F 16/9038

OTHER PUBLICATIONS

Notification of TransmiLlal of International Search Report and Written Opinion for PCT Application No. PCT/US2021/028019 dated Jul. 2, 2021, 16 pages.

* cited by examiner

ADDING MACHINE UNDERSTANDING ON SPREADSHEETS DATA

TECHNICAL FIELD

Aspects and implementations of the present disclosure relate to electronic documents, and more particularly to adding machine understanding on spreadsheets data.

BACKGROUND

Spreadsheet documents may be used for organizing and analyzing large amounts of information. Information in a spreadsheet document may be contained in cells, arranged as rows and columns, on one or more sheets. For example, spreadsheets may be used for managing and manipulating financial information, engineering information, or any organizational information. A user may use a spreadsheet software application to manipulate (e.g., create, edit, view, print, etc.) electronic spreadsheets. When editing an electronic spreadsheet, the user may change the content of the spreadsheet by removing text, entering new text, formatting the spreadsheet layout, adding graphs or charts, or otherwise changing the content of the spreadsheet.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular embodiments of the disclosure or any scope of the claims. Its sole purpose is to present some concepts of the disclosure in a simplified form as a prelude to the more detailed description that is presented later.

A system and method are disclosed for adding machine understanding on spreadsheets data. A processing device may determine a set of data, each data including the contents of a cell in a column of a spreadsheet presented to a user. The processing device may determine, based on the set of data, an entity type associated with the column. The entity type may represent the semantic meaning of the set of data in the column.

In some implementations, in order to determine the entity type associated with the column, the processing device may identify one or more entities on a knowledge graph associated with each cell in the column. A knowledge graph may be described as a knowledge base having structured information about a plurality of semantic entities and relational connections between the semantic entities. The nodes of the knowledge graph may represent the entities, and the relational connections between the entities may be represented by edges. The knowledge graph may be a public knowledge graph or a privately maintained knowledge graph.

In order to identify one or more entities for each cell, the processing device may compare the data in the cell to nodes on the knowledge graph. The processing device may then determine one or more commonly shared entity types for the column based on the number of cells in the column that share the entity type. To be considered a commonly shared entity type for the column, the number of cells that share that entity type must satisfy a threshold condition. For example, the number of cells that share an entity type must exceed 95% of the cells in the column in order to be considered a commonly shared entity type for the column. The method may then determine an entity type for the column by selecting the commonly shared entity type that is shared amongst the most number of cells in the column.

In one embodiment, the processing device may then identify at least one chart that is relevant to the entity type associated with the column. The processing device may score the various chart types based on a set of rules that takes into account the semantic meaning of the column, or based on an output of a machine learning model. The set of rules may instruct which charts should be considered for a particular semantic meaning associated with the column, and/or which score should be assigned to each of the considered charts. The rules may be different for different users or different classes or categories of users, and may be predetermined or configurable based on user input. The machine learning model may be trained to assign a score to each chart type based on one or more entity types derived from the semantic meaning of the column, and optionally based on one or more characteristics of the user. The processing device may rank the chart types based on their scores, and may provide the most relevant chart type (i.e., the chart type that has the highest score) for presentation to the user. Additionally or alternatively, the processing device may provide more than one recommended chart type to the user based on the ranking of the chart types. For example, the processing device may provide the top N chart types as recommendations to the user based on the ranking, where N is an integer. As another example, the processing device may provide, as recommendation to the user, the one or more charts that have a score that satisfies a threshold condition.

In one embodiment, the processing device may identify additional information that is relevant to the entity type of the column, and may add one or more columns with the identified additional information to the spreadsheet. The processing device may identify entity type(s) that are closely related to the entity type of the column based on a set of rules that takes into account the semantic meaning of the column, or based on an output of a machine learning model. The set of rules may instruct which entity types should be considered for a particular semantic meaning associated with the column, and/or which score should be assigned to each of the considered entity types. As above, the rules may be different for different users or different classes or categories of users, and may be predetermined or configurable based on user input. The machine learning model may be trained to assign a score to each entity type based on the semantic meaning of the column, and optionally based on one or more characteristics of the user. The entity types with a score that satisfies a threshold condition may be considered closely related. The processing device may then extract the data from the entities that have a closely related entity type to add to the spreadsheet for presentation to the user. Alternatively, the processing device may recommend adding the additional information to the spreadsheet, and responsive to receiving a user selection, may add one or more columns containing the additional information.

If the cells in a column do not satisfy the threshold condition, so that an entity type of the column cannot be determined, the spreadsheet may operate as before, without the added machine understanding of the data. However, the method described herein may be executed every time the spreadsheet is updated, or on a fixed interval, such that an entity type of each column may subsequently be determined.

The subject matter, summarized above and described below in more detail, enables automatic and real-time determinations of the semantic meanings of columns. This determined semantic meaning can automatically improve existing features of the spreadsheet software, as well as provide additional new features to the user. These improvements, in turn, enhance the speed and efficiency of the computer running the spreadsheet software, reduce the error-rate associated with manual entity type determining procedures, and avoid generating unwanted recommendations to users.

The subject matter described herein is not limited to the above exemplary listed advantages. Further advantages are achievable and recognizable in view of the disclosure of the present application.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

Figure 1:
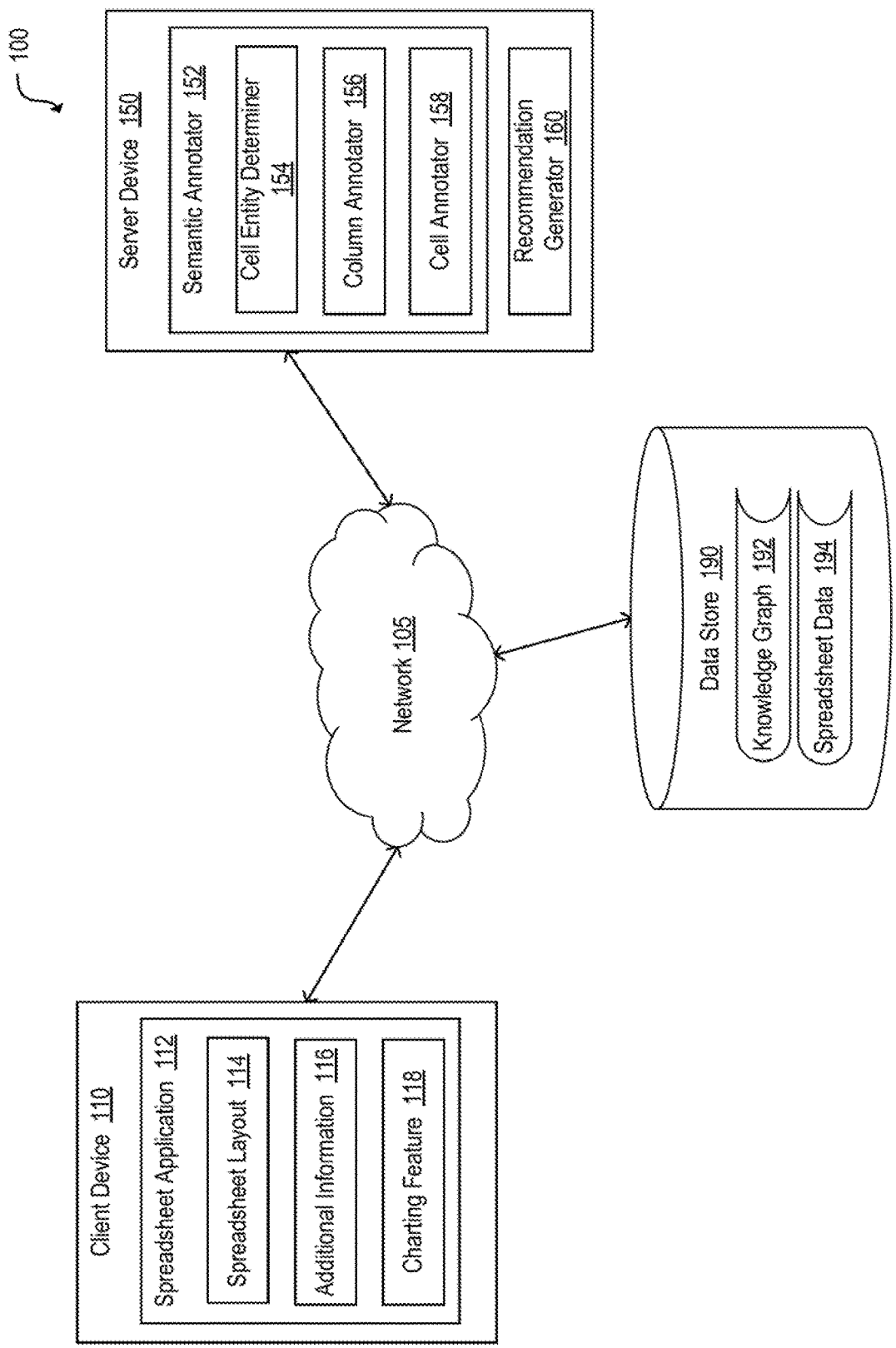
FIG. 1 illustrates an example system architecture for spreadsheet software application to add machine understanding to spreadsheets data, in accordance with an implementation of the disclosure.

These drawings may be better understood when observed in connection with the following detailed description.

DETAILED DESCRIPTION

Spreadsheet software applications may store user data as a series of text and numbers. Spreadsheet applications may offer common spreadsheet functions using the series of text and numbers, including formatting, graphing, filtering, etc. However, a gap exists between what the data in the spreadsheet mean to users in the real world, and what the spreadsheet software can understand and operate on. For example, a user may know that a column includes a list of countries, however to a spreadsheet application, the list of countries is simply a series of text strings. While a spreadsheet application may make use of the text strings when executing the features and functions of the application, the features can be limited by what the computer understands the text strings to represent. As a result, the features and functions provided to the user may not be relevant to the user's needs, and therefore may result in wasted computing resources and negative user experience.

Aspects and implementations of the present disclosure address the above and other deficiencies or problems by providing technology that adds machine understanding on spreadsheet data. Aspects of the present disclosure may then use the added machine understanding of the spreadsheet data to enhance existing features and functions of the spreadsheet application, as well as provide new features to the user. For example, by adding machine understanding on spreadsheet data, the spreadsheet application may recognize that a column lists country names, and as a result may recommend a geographical chart to the user. As another example, the spreadsheet application may recognize that the spreadsheet includes a list of dates and associated events, and may recommend a timeline chart to the user. Adding machine understanding on spreadsheet data may also provide additional, new features. For example, once the spreadsheet application recognizes that a column includes a list of employee identification numbers, the application may auto-populate employee names, email addresses, and office locations.

Spreadsheet software applications may be provided to a client device from a server over a network. The server may store the data, and through the spreadsheet application, may present the data in the form of a spreadsheet. The spreadsheet application and/or the server may analyze the data in order to provide valuable features to the user. The spreadsheet application may transfer the spreadsheet data to the server over the network, which may trigger a semantic annotator on the server. The semantic annotator may add additional meaning to the spreadsheet data by linking the spreadsheet data with entities on a knowledge graph. The semantic annotator may determine the entity type of each cell and column, and annotate the cells and columns within the spreadsheet with their respective determined types. Loading and/or saving the spreadsheet may automatically trigger the semantic annotator on the server. The semantic annotator may also be triggered on a fixed interval, for example every several milliseconds, or every two seconds. The interval may be adjusted, for example, to compensate for latency caused by the annotator. For spreadsheets that contain multiple worksheets, the semantic annotator may annotate the columns of the spreadsheet one worksheet at a time during the initial load in order to balance resource needs for loading and processing multiple worksheets with the latency for determining column annotations.

The semantic annotator may begin by linking each cell of a column with one or more entities on the knowledge graph associated with the data in each cell. A knowledge graph may be a data structure that stores ontological data. In other words, a knowledge graph may be a knowledge base having structured information about a plurality of semantic entities and relational connections between the semantic entities. A knowledge graph may store information in the form of nodes and edges, with nodes being connected by edges. A node in the knowledge may represent an entity. An entity may be a person, place, item, idea, topic, abstract concept, concrete element, other suitable thing, or any combination of these. An entity in the knowledge graph may be related to any quantity of other entities by edges, which may represent relationships between entities. Each semantic entity (also referred to as "entity") has one or several types.

Each cell in the spreadsheet may be annotated with the entity or entities associated with the cell data. In one implementation, the semantic annotator may use a machine learning engine to label as many cells as it can with entities on the knowledge graph. For example, the spreadsheet data may include a cell that includes the word "Coca-Cola®" (a registered trademark of The Coca-Cola Company). The machine learning engine may label the cell many entities on the knowledge graph associated with Coca-Cola®, including entities related to product names, beverages, carbonated beverages, parent company, etc. The machine learning engine may be trained to identify entities on the knowledge graph that are associated with a set of data using collected historical data. The machine learning engine may be supervised or unsupervised. In other implementations, the semantic annotator may associate entities on a knowledge graph using any other known technique.

The semantic annotator may then determine an entity type associated with the column. The entity type may represent the semantic meaning of the set of data in the column. In one implementation, the semantic annotator may aggregate the determined cell entities to determine one or more commonly shared entity type of the column. A commonly shared entity type may be determined by the percentage of cells in the column that are associated with the same entity type in the knowledge graph. For example, a column may be considered to have a semantic meaning of "country" if the column contains more than 95% cells that are associated with a "country" entity on the knowledge graph. The percentage, or threshold, may be adjusted depending on the size of the column, for example, or on the subject matter itself. A column may be considered to have more than one commonly shared entity type if more than the threshold number of cells are associated with more than one entity type. For example, more than 95% of the cells in a column may refer to both a "company name" entity and a "carbonated beverage" entity.

In order to determine the entity type associated with the column, the semantic annotator may determine the entity type, among the commonly shared entity types, that is shared amongst the most number of cells in the column. That is, the column entity type must both satisfy the threshold condition, and be the most shared entity type within the column. For example, if more than 95% of the cells in the column refer to both a company name and a carbonated beverage, but the number of cells that refer to a carbonated beverage exceed the number of cells that refer to a company name, then the semantic annotator will determine that the entity type, and therefore the semantic meaning, of the column is "carbonated beverage."

The semantic annotator may then annotate the column with the determined entity type, as well as annotate each cell in the column with the entity on the knowledge graph related to the entity type. For each cell, the semantic annotator may select the entity on the knowledge graph that is associated with the determined entity type for the column, and link the cell to that entity. Continuing with the example above, once the semantic annotator has determined that the column type is "carbonated beverage," the semantic annotator may first annotate the column with the entity type, and then annotate each cell with the specific entity related to the carbonated beverage listed in that cell. So if the cell included the word "Coca-Cola®," the semantic annotator may annotate the cell with the "Coca-Cola® carbonated beverage" entity in the knowledge graph (as opposed to the "The Coca-Cola® Company" entity in the knowledge graph).

Once the semantic annotator has annotated the columns and cells in a spreadsheet, the spreadsheet application may then make use of the annotations to provide beneficial features to the user. For example, having determined that a column has an entity type of "carbonated beverage," the spreadsheet application may suggest additional information for the user to include related to carbonated beverages. As another example, having determined that a column has an entity type of "country," the spreadsheet application may recommend to the user a geographical chart.

Some technical advantages of implementations of the present disclosure include enhancing spreadsheet software application automatically and in real-time. By automatically determining the meaning of cells and columns, users are not required to manually provide or annotate individual cells or columns. While some users may provide headers to describe the columns in spreadsheets, many do not. Moreover, header data can be unreliable as there is no standard practice for labeling columns. For example, while one user may find it helpful to label a column containing names of countries "country," another user may label that same column as "offices," for example, if the column lists the countries in which the company has offices. Additionally, the machine readable meanings derived from the systems and methods described herein are up-to-date with the data in the spreadsheet. The spreadsheet application may enhance the functioning of the computer on which it is running by enhancing the speed and efficiency of the application, resulting in faster processing times. The spreadsheet application may also avoid unwanted software recommendations, thus reducing wasted computer resources.

Various aspects of the above referenced methods and systems are described in detail herein below by way of examples, rather than by way of limitation.

FIG. 1 illustrates an example system architecture 100 for spreadsheet software application to add machine understanding to spreadsheets data, in accordance with an implementation of the present disclosure.

The system architecture 100 may include a server 150 that may be connected to one or more client devices 110 and to a data store 190, via a network 105. The network 105 may be a public network (e.g., the Internet), a private network (e.g., a local area network (LAN) or wide area network (WAN)), or a combination thereof. The network 105 may include a wireless infrastructure, which may be provided by one or more wireless communications systems, such as a wireless fidelity (WiFi) hotspot connected with the network 105 and/or a wireless carrier system that can be implemented using various data processing equipment, communication towers, etc. Additionally or alternatively, the network 105 can include a wired infrastructure (e.g., Ethernet).

The client device 110 may include a spreadsheet application 112 used to create, edit, view, and/or share spreadsheets. In one embodiment, the spreadsheet application 112 may be accessed through the network 105 and may allow a user to collaborate on a shared spreadsheet with other users. That is, users may be able to concurrently edit the contents or format of a collaborative spreadsheet via their respective spreadsheet applications 112 and the resulting changes may be presented to the users via their respective spreadsheet applications 112 in real-time (e.g., with a minimal delay of milliseconds). The spreadsheet application 112 may include a variety of features, including a spreadsheet layout feature 114, an additional information feature 116, and a charting feature 118. The spreadsheet layout feature 114 may determine the layout of the spreadsheet. For example, the spreadsheet layout feature 114 may determine the appropriate locations for page breaks and header rows in the spreadsheet. The additional information feature 116 may determine additional data that may be useful to the client. The charting feature 118 may be used by the client to create and add charts to the spreadsheet. Each feature may be enhanced by the determination of the semantic meaning of the data in the spreadsheet. A spreadsheet application may contain additional features not shown here. Alternatively, not all features shown in FIG. 1 must be present in the spreadsheet application. The data in the spreadsheet may be stored in the data store 190 as spreadsheet data 194.

The server device 150 may include a semantic annotator 152, which may include a cell entity determiner 154, a column annotator 156, and a cell annotator 158. The server device 150 may also include a recommendation generator 160.

Data store 190 may maintain a knowledge graph 192. Knowledge graph 192 may be a data structure that stores ontological data. In other words, knowledge graph 192 may be a knowledge base having structured information about a plurality of semantic entities and relational connections between the semantic entities. The knowledge graph 192 may store information in the form of nodes and edges, with nodes being connected by edges. A node in the knowledge may represent an entity. An entity may be a person, place, item, idea, topic, abstract concept, concrete element, other suitable thing, or any combination of these. An entity in the knowledge graph may be related to any quantity of other entities by edges, which may represent relationships between entities. Each semantic entity (also referred to as "entity") has one or several types.

Data store 190 may store spreadsheet data 194, which includes the data contained in each cell in each spreadsheet. The semantic annotator 152 may analyze the data from each cell in order to determine a semantic meaning for each column. The recommendation generator 160 may then trigger the spreadsheet application 112 to make certain recommendations based on the semantic meaning of the columns.

Semantic annotator 152 may include a cell entity determiner 154, a column annotator 156, and a cell annotator 158. The cell entity determiner 154 may identify one or more entities of the data associated with each cell in a column. To do so, the cell entity determiner 154 may consult the knowledge graph 192 and identify one or more nodes on the knowledge graph that are associated with the data in the cell. For example, if the cell contains the word "English," the cell entity determiner 154 may consult the knowledge graph 192 and identify nodes on the graph that are related to the word "English," which might include a language node, a nationality node, a school subject matter node, etc. The cell entity determiner 154 assigns the entities to the cell.

The column annotator 156 may then determine the entity type of the column based on the semantic meaning. In order to determine the semantic meaning of the column, the column annotator 156 may aggregate the entity types for the cells in a column. The column annotator 156 may then determine how many cells share each of the entity types. If more than a threshold number of cells in a column share an entity type, the column annotator 156 may determine that that entity type is a commonly shared entity type for the column. The threshold may be a percentage of all the cells in the column, for example 95%. The threshold may be adjustable, depending on the size of the column, or on the subject matter in the column, for example.

Once the column annotator 156 has determined one or more commonly shared entity types for the column, it may determine the semantic meaning of the column. The semantic meaning may be based on the commonly shared entity type that is shared amongst the most number of cells in the column. The column annotator 156 may then annotate the column metadata with the semantic meaning, or the entity type associated with the semantic meaning of the column. The cell annotator 158 may then annotate each cell in the column with the knowledge graph entity that corresponds to the column entity type. That is, going back to the example above, if the column annotator 156 determined that the entity type of the column (containing the cell that has the word "English" in it) is "language," the cell annotator 158 may annotate the cell by linking it to the node in the knowledge graph 192 that represents "English language" (as opposed to the nodes representing "English nationality," or "English subject matter in school").

The recommendation generator 160 may then consume the meaning of the column and trigger a variety of features in the spreadsheet application 112. For example, the recommendation generator 160 may use the entity type of the column and the assigned meaning of the cells to determine the best type of chart to recommend to the user. The recommendation generator 160 may determine, based on the entity type of the column, that the most relevant chart to represent the data in the column(s) is a geographical chart, for example. In one embodiment, the recommendation generator 160 may rank the available chart types based on each type's relevance to the column's entity type, and display the top N relevant charts, for example (where N is an integer greater than 0) to allow the user to select a desired chart. Alternatively or additionally, the recommendation generator 160 may determine that no chart would accurately represent the data in the columns, and may decide not to recommend a chart at all, thus avoiding making bad recommendations.

In some implementations, the recommendation generator 160 may trigger other additional features in the spreadsheet application 112. For example, the recommendation generator 160 may determine that a specific layout would be most beneficial for displaying the column data based on the determined column entity type. The recommendation generator 160, based on this determination, may trigger the spreadsheet layout 114 feature of the spreadsheet application 112. In some implementations, the recommendation generator 160 may trigger the additional information 116 feature of the spreadsheet application 112. For example, the column entity type may be "employee name," the recommendation generator 160 may identify additional information related to the employee name entity type, such as "employee home office," or "employee ID." The recommendation generator 160 may then add one or more columns with the identified additional information to the spreadsheet.

In some implementations, the determined chart(s) and/or added column(s) may be concurrently presented to all the users that are collaborating on the spreadsheet, and each of the collaborating users can make changes to the determined chart(s) and/or added column(s), which can then be visible to other collaborating users in real time. In some embodiments, different types of charts can be presented to different users that are collaborating on the spreadsheet, based on different actions/preferences taken by those users in the past.

Figure 2:
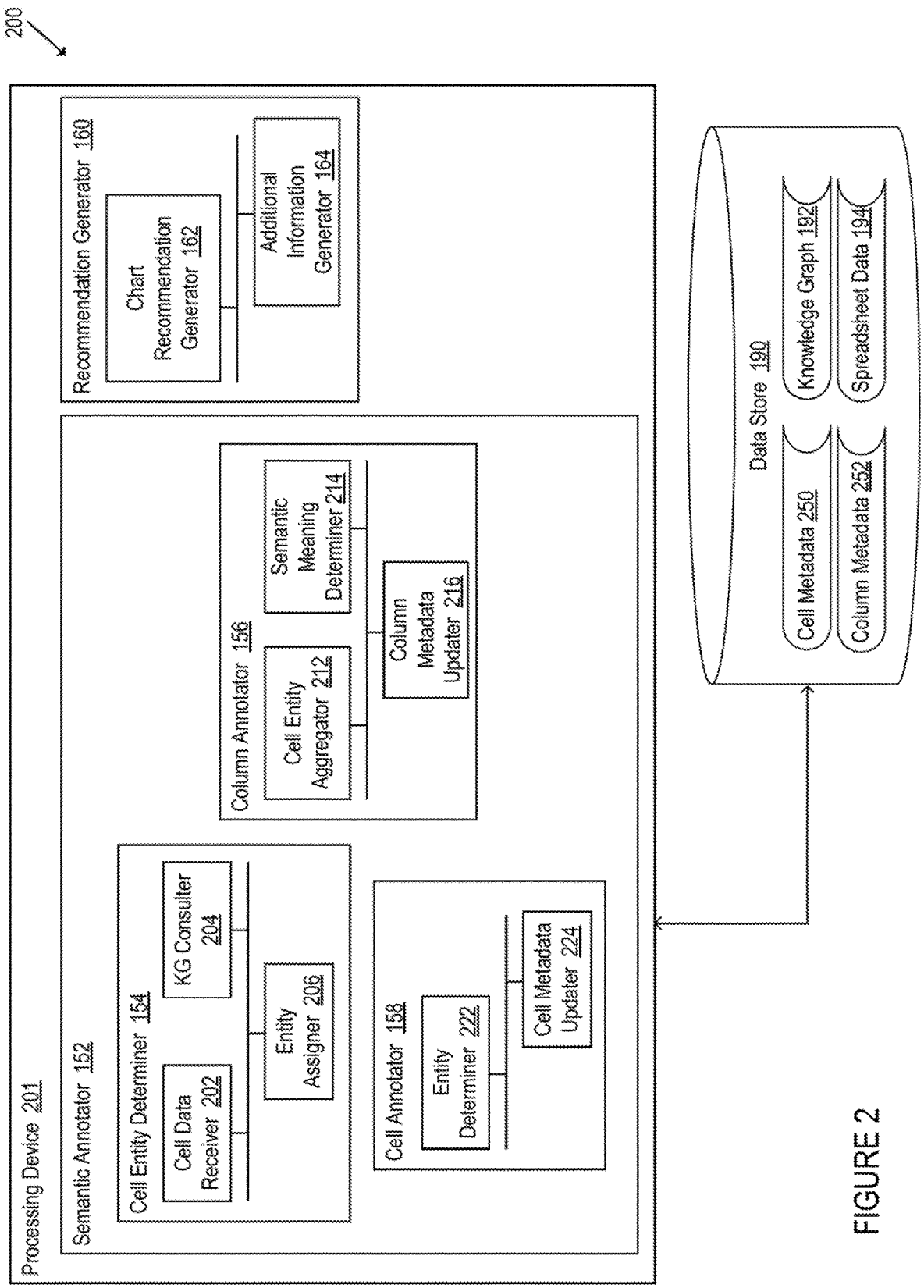
FIG. 2 depicts an example of a system architecture for adding machine understanding to spreadsheet data, in accordance with an implementation of the disclosure.

FIG. 2 depicts an example of a system architecture 200 for adding machine understanding to spreadsheet data, in accordance with an implementation of the disclosure.

The system architecture 200 includes one or more processing devices 201 and one or more data stores 190. In the example shown, the processing device 201 includes a semantic annotator 152 and a recommendation generator 160. The processing device 201 may be included in a server device 150 in FIG. 1. The semantic annotator 152 may include a cell entity determiner 154, a column annotator 156, and a cell annotator 158. The recommendation generator 160 may include a chart recommendation generator 162, and an additional information generator 164. The data store 190 may maintain a knowledge graph 192, spreadsheet data 194, cell metadata 250, and column metadata 252. The cell metadata 250 may include descriptive attributes of each cell, for example, the cell's location in the spreadsheet, when it was last updated, whether the cell is visible or not, among other things. The cell metadata 250 may also include an annotation linking the cell to a node on the knowledge graph 192. Similarly, the column metadata 252 may include descriptions of each column, for example, when the column was last updated, the name of the user who last modified the column, among other things. The column metadata 252 may also include an annotation specifying the semantic meaning of the column.

The cell entity determiner 154 may identify one or more entities of the data associated with each cell in a column. The data associated with each cell may be stored in spreadsheet data 194 of data store 190. The cell entity determiner 154 may include a cell data receiver 202, a knowledge graph (KG) consulter 204, and an entity assigner 206. The cell data receiver 202 may receive cell data from the spreadsheet data 194. The KG consulter 204 may consult the knowledge graph 192 in order to identify one or more entities associated with the cell data. In one implementation, the KG consulter 204 may compare the cell data with the nodes in the knowledge graph 192 to determine which nodes most represent the cell data. In one implementation, the KG consulter 204 may be trained using machine learning to identify nodes on the knowledge graph that are associated with a given data. The entity assigner 206 may then label each cell with its associated entity (or entities), as well as the entity type(s), from the knowledge graph.

The column annotator 156 may include a cell entity aggregator 212, a semantic meaning determiner 214, and a column metadata updater 216. The cell entity aggregator 212 may aggregate the entity types of the cells in a column. For example, the cell entity aggregator 212 may generate a list of all the entity types referred to by cells in the column, and include a total number of cells that refer to each entity type. The semantic meaning determiner 214 may then use the aggregated entity type information to determine the semantic meaning of the column. The semantic meaning may represent the machine understanding of each column in the spreadsheet. The machine understanding of the column may refer to the most relevant entity type of one or more entity types (or entities) that can represent the contents of the column (determined as discussed in more detail below). The column may then be annotated with entity type associated with the semantic meaning of the column. The column metadata updater 216 may update the column metadata 252 to include the entity type associated with the semantic meaning of the column.

The cell annotator 158 may include an entity determiner 222 and a cell metadata updater 224. The entity determiner 222 may determine the entity on the knowledge graph 192 that is associated with the cell data and that shares the same entity type as the column. While each cell may be associated with more than one entity, the entity determiner 222 may determine the entity that shares the determined entity type of the column. The cell metadata updater 224 may then update the cell metadata 250 to link the cell with the determined entity on the knowledge graph 192.

The recommendation generator 160 may include a chart recommendation generator 162 and an additional information generator 164. The recommendation generator 160 may include additional components not shown here. The chart recommendation generator 162 may rank the available chart types based on their relevance to the entity type of the column being charted. For example, the chart recommendation generator 162 may assign a score to each chart type based on a set of rules that take into account the entity type of the column or based on an output of a machine learning model. Once the scores have been determined for each chart type, the chart recommendation generator 162 may identify the chart with the highest score, and recommend and/or add that chart to the spreadsheet presented to the user. In one implementation, the chart recommendation generator 162 may rank the chart types based on their scores, and recommend the top N charts, for example, where N is an integer. Or the chart recommendation generator 162 may display all the chart options to the user in order of their scores, from highest score to lowest score. In one implementation, the chart recommendation generator 162 may recommend the one or more charts that have a score that satisfies a threshold condition. For example, the assigned scores may range from 0-10, 10 representing the most relevant chart type, the lowest acceptable value may be set to 7. Hence, the threshold condition may be set to identify charts that have a score equal to or higher than 7, and the chart recommendation generator 162 may then recommend the chart(s) that have a score equal to or higher than 7. The threshold condition may be adjustable.

In one embodiment, the set of rules may instruct what charts should be considered for a particular semantic meaning associated with contents of a column, and/or what score should be assigned to each of the considered charts for the particular semantic meaning associated with the contents of the column. The semantic meaning may refer to one or more most relevant entities that can represent the contents of the column. The rules may be different for different users or different classes or categories of users (e.g., based on browser type, screen resolution, etc.) and may be predetermined or configurable based on user input.

In one embodiment, a training engine (not shown) may train a machine learning model using a machine learning technique to predict what chart a user would select for a particular column. For example, the model may be trained to assign a score to each chart type based on one or more entity types derived from the semantic meaning of the contents of the column (and optionally based on one or more characteristics of a user that is to be provided with a chart recommendation). The training data may be based on collected historical data and may include training inputs and associated target outputs. Training inputs may include, for example, entity types of columns in spreadsheets previously used by users, characteristics of the users and the like. Training outputs may include previous user actions pertaining to charts used for the respective columns, such as user usage or selection of a chart, and/or user's identified chart preferences. The training data may be associated with the user's account (e.g., based on a username and password), and the user may opt out from the processing device collecting such data at any time.

Once trained, the model may take an entity type as input, and provide a weight ("score") for each chart type as output. In some implementations, the input provided to the model may also include one or more characteristics (e.g., browser type, screen resolution, etc.) of a particular user for whom relevant charts are being recommended to take into account different preferences of different classes of users. The chart type with the highest score may be the most relevant chart for that entity type. In some implementations, different chart recommendations may be provided to different users for the same column in view of different preferences and/or past actions of those users (including, for example, different collaborators on the same spreadsheet). The machine learning model may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a back-propagation learning algorithm or the like.

The additional information generator 164 may use the entity type of the column to generate additional information associated with the entity type. The additional information generator 164 may auto-populate the additional information for the user. For example, the semantic annotator 152 may have determined that the column entity type is "country." The additional information generator 164 may gather additional information from the knowledge graph 192 related to the countries listed in the column, for example population or capital cities. In some embodiments, the additional information generator 164 may assign a score to each entity type in the knowledge graph based on a set of rules that take into account the entity type of the column, or based on an output of a machine learning model, similar to the chart recommendation generator 162 and further described below with regards to FIG. 5. The additional information generator 164 may extract the data from the entities in the knowledge graphs that have an entity type with a score that exceeds a threshold condition. The additional information generator 164 may then recommend to the user to include such additional information (i.e., the extracted data) in the spreadsheet, and/or may automatically add the information to the spreadsheet.

Figure 3:
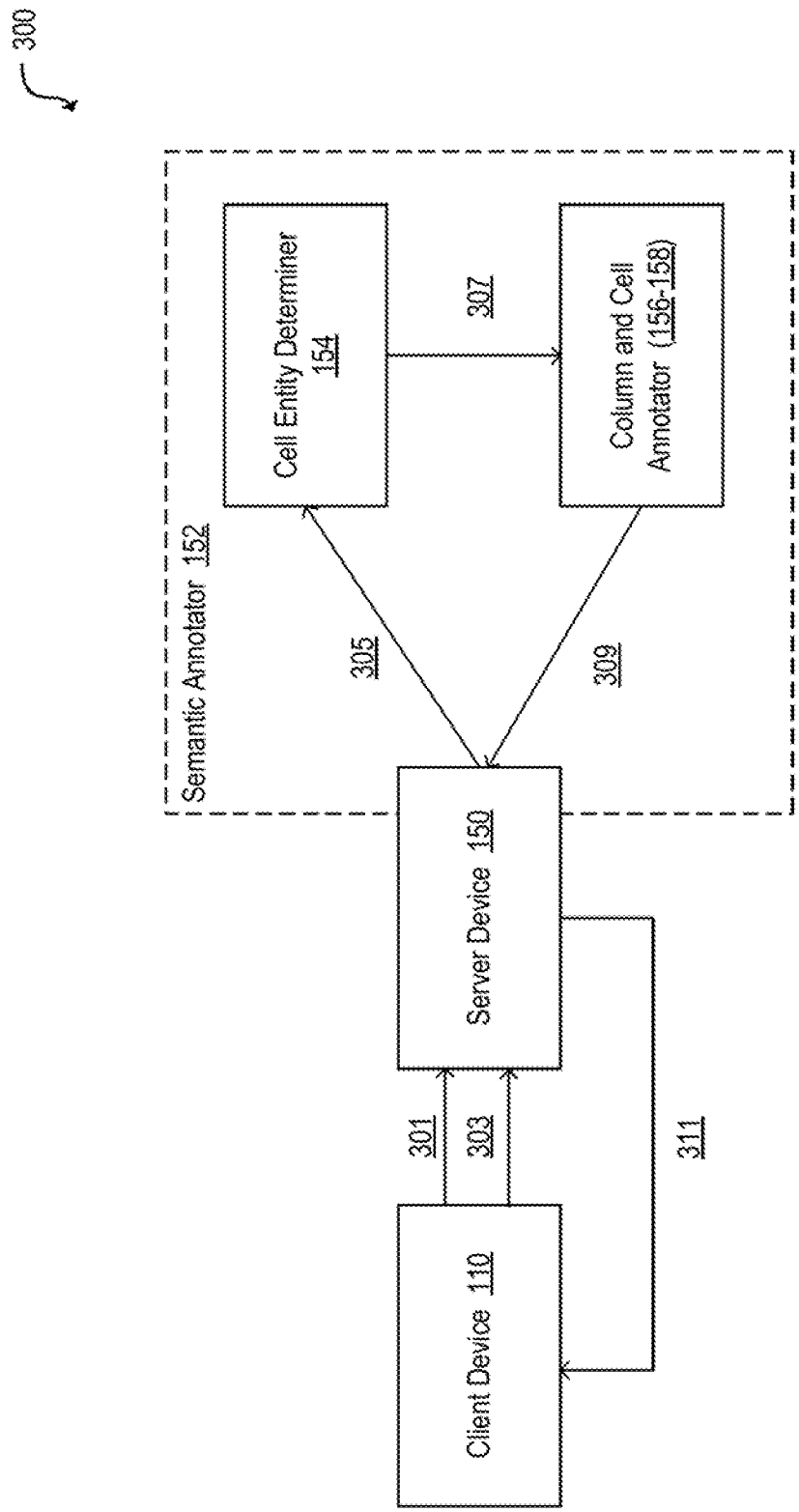
FIG. 3 illustrates an example system transferring data between entities in the system for adding machine understanding on spreadsheet data, in accordance with an implementation of the disclosure.

FIG. 3 illustrates an example of system 300 and the transfer of data between the entities illustrated in FIG. 1 for adding machine understanding on spreadsheet data, in accordance with an implementation of the disclosure.

The system 300 may include a client device 110 and a server device 150. At operation 301, the user of the client device may load a spreadsheet in a spreadsheet application, which may trigger the transfer of spreadsheet data from the client device 110 to the server device 150. At operation 303, the user may save or update the spreadsheet in a spreadsheet application, which may trigger the transfer of modified spreadsheet data from the client device 110 to the server device 150. The transfer of spreadsheet data may be triggered by other operations, including on a fixed interval schedule (e.g., every few milliseconds).

Once the server device 150 receives spreadsheet data from the client device 110, it may execute a semantic annotator 152. At operation 305, the semantic annotator may first execute the cell entity determiner 154, as described with regards to FIG. 2. At operation 307, the semantic annotator 152 may use the determined cell entity data to execute the column annotator 156 and the cell annotator 158, as described with regards to FIG. 2.

At operation 309, the semantic annotator 152 may update the spreadsheet data saved on the server device 150, or may be stored on a data store (not shown). This updated spreadsheet data may now be considered the machine understanding of the spreadsheet data. At operation 311, the server device 150 may then generate recommendations for the user of client device 110 with regards to the added machine understanding of the spreadsheet data. For example, using the added machine understanding of the spreadsheet data, the spreadsheet application may recommend a relevant chart type to the user, or may add additional relevant information to the spreadsheet.

Figure 4:
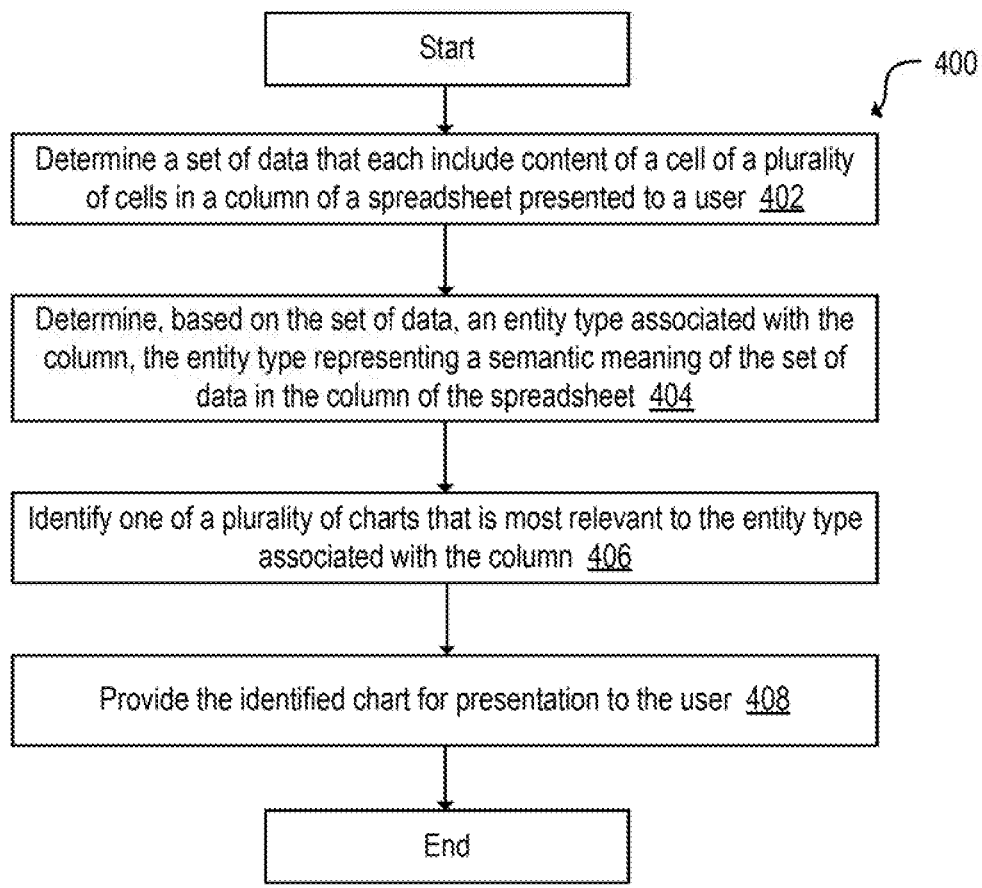
FIG. 4 depicts a flow diagram of a method for adding machine understanding on spreadsheet data and providing a chart recommendation to a user, in accordance with an implementation of the disclosure.
Figure 5:
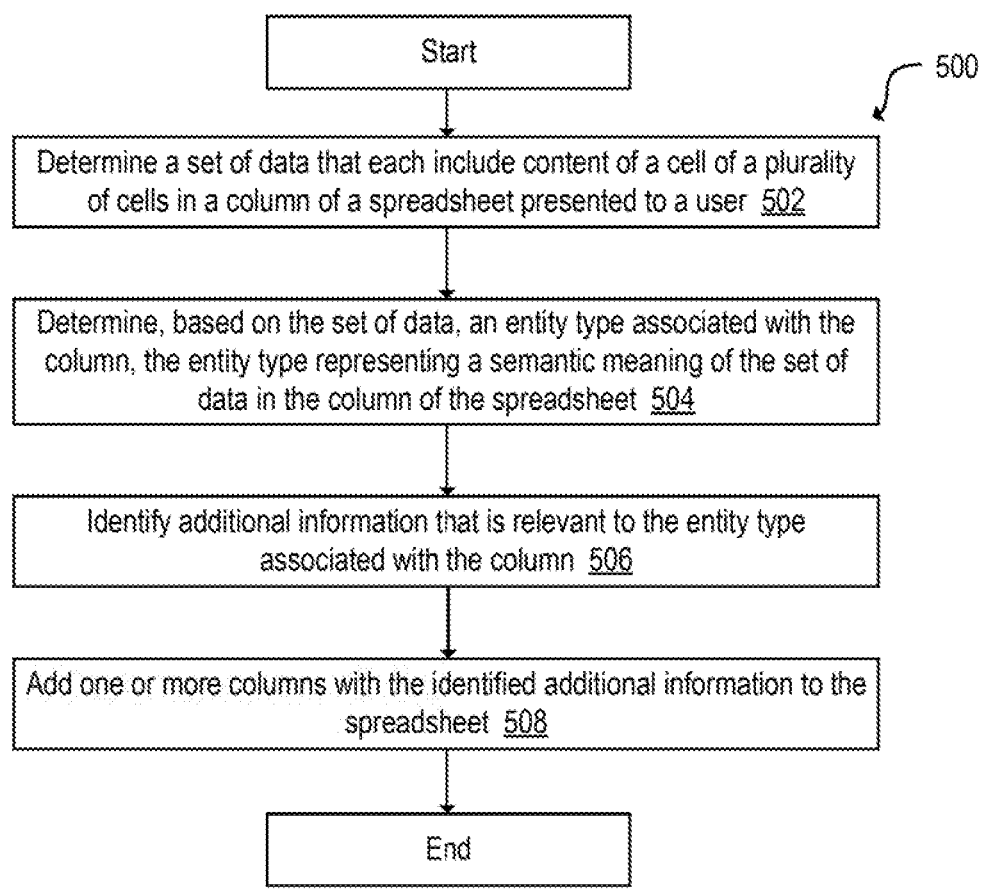
FIG. 5 depicts a flow diagram of a method for adding machine understanding on spreadsheet data and providing additional information for presentation to a user, in accordance with an implementation of the disclosure.

FIGS. 4 and 5 depict flow diagrams of methods 400 and 500 performed in accordance with some implementations of the disclosure. The methods 400 and 500 may be performed by a client-based application that runs on a client device 110. The client-based application may be executed by a processing device of the client device 110.

For simplicity of explanation, methods 400 and 500 of this disclosure are depicted and described as a series of acts. However, acts in accordance with this disclosure can occur in various orders and/or concurrently, and with other acts not presented and described herein. Furthermore, not all illustrated acts may be required to implement methods 400 and 500 in accordance with the disclosed subject matter. In addition, those skilled in the art will understand and appreciate that methods 400 and 500 could alternatively be represented as a series of interrelated states via a state diagram or events. Additionally, it should be appreciated that methods 400 and 500 disclosed in this specification are capable of being stored on an article of manufacture to facilitate transporting and transferring such method to computing devices. The term "article of manufacture," as used herein, is intended to encompass a computer program accessible from any computer-readable device or storage media.

FIG. 4 is a flow diagram of method 400 for adding machine understanding on spreadsheet data and providing a chart recommendation to a user, in accordance with some implementations of the disclosure.

Referring to FIG. 4, at operation 402, the processing device of a client device 110 may determine a set of data that each include content of a cell of one or more cells in a column of a spreadsheet presented to a user.

At operation 404, the processing device may determine, based on the set of data, an entity type associated with the column. The entity type may represent a semantic meaning of the set of data in the column of the spreadsheet. Determining the entity type associated with the column may include identifying one or more entities associated with the data of each cell in the column. In order to identify one or more entities associated with the data of each cell, the process device may identify the entities from a knowledge graph that has a knowledge base having structured information about a plurality of entities and relational connections between the entities. Once the process device has identified the one or more entities associated with each cell, the processing device may determine one or more commonly shared entity types for the cells in the column. The commonly shared entity types may be determined based on a number of cells sharing the same entity type. An entity type may be determined to be commonly shared if the number of cells that share that entity type satisfies a threshold. For example, if 95% of the cells in a column share an entity type, the process device may determine that that entity type is commonly shared throughout the column. The threshold may be adjustable. The processing device may then determine the semantic meaning of the column by determining which commonly shared entity type is shared among the most number of cells. The most commonly shared entity type is then the semantic meaning of the column.

At operation 406, the processing device may identify at least one of a plurality of charts that is relevant (e.g., the one that is most relevant) to the entity type associated with the column. That is, the processing device may determine a score for each chart in the plurality of charts based on a set of rules that takes into account the semantic meaning of the column or based on an output of a machine learning model. The processing device may then rank the charts, and identify the chart with the highest score. In one implementation, the processing device may identify one or more charts relevant to the entity type associated with the column. The one or more identified charts may be considered relevant if they have a score that satisfies a threshold condition.

In one embodiment, the set of rules may instruct what charts should be considered for a particular semantic meaning associated with contents of the column, and/or what score should be assigned to each of the considered charts for the particular semantic meaning associated with the contents of the column. The rules may be different for different users or different classes or categories of users (e.g., based on browser type, screen resolution, etc.) and may be predetermined or configurable based on user input.

In one implementation, the processing device may identify a rule corresponding to the entity type associated with the column. Based on that rule, the processing device may determine a subset of charts pertaining to the entity type associated with the column, and may determine a score for each chart in the subset. The processing device may then identify a chart with a highest score in the determined subset of charts. Additionally or alternatively, the processing device may identify one or more charts from the subset that have a score that satisfy a threshold condition (e.g., that exceed a set value).

As described above, a training engine may train a machine learning model using a machine learning technique to predict what chart a user would select for a particular column. Once trained, the model may take an entity type as input, and provide a weight ("score") for each chart type as output. In some implementations, the input provided to the model may also include one or more characteristics (e.g., browser type, screen resolution, etc.) of a particular user for whom relevant charts are being recommended to take into account different preferences of different classes of users. The chart type with the highest score may be the most relevant chart for that entity type.

At operation 408, the processing device may provide the identified chart for presentation to the user. In one implementation, the processing device may provide a recommendation to the user based on the identified chart. Then, in response to receiving a user selection regarding the recommended chart, the processing device may provide the chart for presentation to the user. In another implementation, the process device may provide a list of recommended charts to the user, ranked by the score determined at operation 406. In some implementations, different chart recommendations may be provided to different users for the same column in view of different preferences and/or past actions of those users (including, for example, different collaborators on the same spreadsheet).

FIG. 5 depicts a flow diagram of method 500 for adding machine understanding on spreadsheet data and providing additional information for presentation to a user, in accordance with an implementation of the disclosure.

At operation 502, the processing device may determine a set of data that each include content of a cell of one or more cells in a column of a spreadsheet presented to a user.

At operation 504, the processing device may determine, based on the set of data, an entity type associated with the column, the entity type representing a semantic meaning of the set of data in the column of the spreadsheet. This process may be the same as operation 404 described with regards to FIG. 4.

At operation 506, the processing device may identify additional information that is relevant to the entity type associated with the column. In some embodiments, in order to identify additional information relevant to the entity type of the column, the processing device may identify one or more additional entity types that are closely related to the entity type associated with the column based on a knowledge graph. In particular, the processing device may first identify a first node in the knowledge graph that is associated with the entity type of the column. The processing device may then identify one or more nodes that are closely related to the first node. A node may be closely related to another node if it is connected by no more than one edge, for example. That is, if two nodes are directly connected to each other in the knowledge graph, they may be considered closely related. The data in the one or more closely connected nodes may be identified as additional information relevant to the entity type associated with the column.

In one embodiment, the processing device may also use a set of rules to instruct what entity types should be considered as additional information for a particular semantic meaning associated with contents of a column, and/or what score should be assigned to each of the considered entity types for the particular semantic meaning associated with the contents of the column. The rules may be different for different users or different classes or categories of users (e.g., based on browser type, screen resolution, etc.) and may be predetermined or configurable based on user input.

In one implementation, the processing device may identify a rule corresponding to the entity type associated with the column. Based on that rule, the processing device may determine a subset of additional entity types pertaining to the entity type associated with the column, and may also determine a score for each additional entity type in the subset. The processing device may then identify one or more additional entity types with a score that satisfies a threshold condition in the determined subset of additional entity types. For example, the assigned scores may range from 0-10, 10 representing the most closely related entity type, the lowest acceptable value may be set to 7. Hence, the threshold condition may be set to identify entity types that have a score equal to or greater than 7. The threshold condition may be adjustable.

In some implementations, in order to identify one or more additional entity types that are closely related to the entity type associated with the column, the processing device may train a machine learning model using a machine learning technique to predict what additional information a user would likely add to a spreadsheet containing a particular column. For example, the model may be trained to assign a weight or score to each entity type in the knowledge graph based on one or more entity types derived from the semantic meaning of the contents of the column (and optionally based on one or more characteristics of a user that is to be provided with the additional information). The training data may be based on collected historical data and may include training inputs and associated target outputs. Training inputs may include, for example, entity types of columns in spreadsheets previously used by users, characteristics of the users, and the like. Training outputs may include previous user actions pertaining to additional information used for the respective columns, such as user inclusion of certain types of information, and/or user's identified information preferences (e.g., a user's preference to use standard weights and measures instead of metric units). The training data may be associated with the user's account (e.g., based on a username and password), and the user may opt out from the processing device collecting such data at any time.

Once trained, the model may take an entity type as input, and provide a weight ("score") for each additional entity type as output. In some implementations, the input provided to the model may also include one or more characteristics (e.g., browser type, screen resolution, etc.) of a particular user for whom additional information is being recommended to take into account different preferences of different classes of users. The entity types with the highest scores may be the entity types that are most closely related to the inputted entity type. In some implementations, different entity types may be provided to different users for the same column in view of different preferences and/or past actions of those users (including, for example, different collaborators on the same spreadsheet). The machine learning model may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like.

At operation 508, the processing device may add one or more columns with the identified additional information to the spreadsheet. In one implementation, the processing device may provide a recommendation to the user based on the identified additional information. In response to receiving a user selection, the processing device may then add the identified additional information to the spreadsheet in one or more columns. That is, if there is one entity type closely related to the entity type of the column, the processing device may add one additional column including the data from the closely related entity type. For example, if the column entity type is "country," a closely related entity type may be "capital city," and the processing device may add a column listing the capital city of each country listed in the "country" column. If more than one entity type is closely related to the entity type of the column, the processing device may add more than one column. For example, the processing device may add a column listing the capital city of each country, as well as the population of each country. The process device may be able to determine whether the additional information is already present in the spreadsheet, to avoid recommending adding duplicate data.

Figure 6:
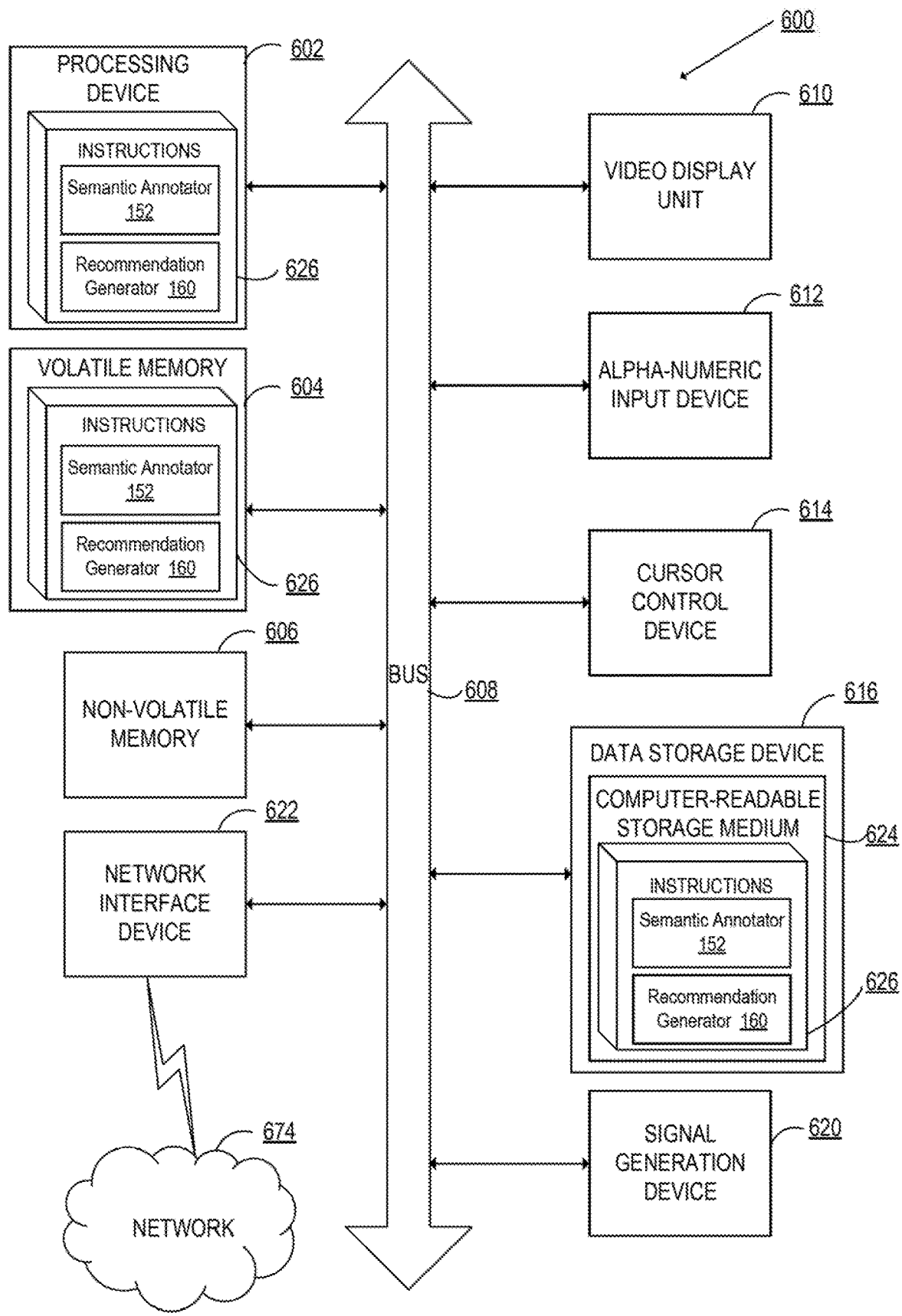
FIG. 6 depicts a block diagram of a computer system operating in accordance with an implementation of the disclosure.

FIG. 6 depicts a block diagram of a computer system operating in accordance with one or more aspects of the present disclosure. In various illustrative examples, computer system 600 may correspond to any of the computing devices within system architecture 100 of FIG. 1. In one implementation, the computer system 600 may be the server device 150 of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 may also include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 400 and 500, and for semantic annotator 152 and recommendation generator 160 of FIGS. 1 and 2.

Instructions 626 may also reside, completely or partially, within volatile memory 604 and/or within the processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500, and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method to generate a chart recommendation based on machine understanding of spreadsheet data comprising:
   determining, by a processing device, a set of data that each include content of a cell of one or more cells in a column of a spreadsheet presented to a plurality of users of a plurality of user devices;
   adding an annotation to metadata of the cell in the column, wherein the annotation is associated with an entity representing a semantic meaning of data in the cell;
   determining, based on the annotation, an entity type associated with the column, the entity type representing a semantic meaning of the set of data in the column of the spreadsheet;
   identifying at least one of a plurality of charts that is relevant to the entity type associated with the column; and
   providing the identified chart for concurrent presentation to the plurality of users.

2. The method of claim 1, wherein determining the entity type associated with the column comprises:
   identifying one or more entities associated with the data of each cell in the column, wherein each entity has an entity type;
   determining one or more commonly shared entity types for the column based on a number of cells in the column that share an entity type, wherein the number of cells satisfies a threshold condition; and
   identifying a commonly shared entity type that has a highest number of cells that share the commonly shared entity type.

3. The method of claim 2, wherein identifying one or more entities associated with the data of each cell in the column comprises identifying one or more entities from a knowledge graph comprising a knowledge base having structured information about a plurality of entities and relational connections between the entities.

4. The method of claim 3, wherein the annotation to the metadata is based on a node on the knowledge graph, wherein the node represents the entity of the one or more entities associated with data in the cell and that is associated with the semantic meaning of the column.

5. The method of claim 1, wherein identifying at least one of the plurality of charts that is relevant to the entity type associated with the column comprises:
   training, using machine learning, a model to assign a score to each chart of the plurality of charts based on entity types in a knowledge graph;
   providing the entity type associated with the column as input to a machine learning model trained using training data including collected historical data;
   obtaining an output of the trained machine learning model, the output indicating a score for each of the plurality of charts for the column; and
   identifying a chart with a highest score.

6. The method of claim 1, wherein identifying at least one of the plurality of charts that is relevant to the entity type associated with the column comprises:
   identifying a rule corresponding to the entity type associated with the column;
   determining, based on the rule, a subset of the plurality of charts pertaining to the entity type associated with the column, and a score for each chart in the subset; and
   identifying a chart with a highest score in the determined subset of charts.

7. The method of claim 1, wherein providing the identified chart for presentation to the user comprises:
   providing a recommendation to the user based on the identified chart; and
   responsive to receiving a user selection, providing the identified chart for presentation to the user.

8. The method of claim 1, further comprising annotating metadata associated with the column based on the semantic meaning of the column.

9. The method of claim 1, wherein identifying at least one of the plurality of charts that is relevant to the entity type associated with the column comprises:
   determining a score for each chart in the plurality of charts based on a set of rules that are associated with the semantic meaning of the column; and
   identifying a chart with a highest score.

10. A system to generate additional information for a spreadsheet based on machine understanding of spreadsheet data, the system comprising:
    a memory; and
    a processing device communicably coupled to the memory, the processing device to:
       determine a set of data that each include content of a cell of one or more cells in a column of the spreadsheet presented to a user;
       add an annotation to metadata of the cell in the column, wherein the annotation is associated with an entity type representing a semantic meaning of the data in the cell;
       determine, based on the annotation, an entity type associated with the column, the entity type representing a semantic meaning of the set of data in the column of the spreadsheet;
       identify additional information that is relevant to the entity type associated with the column; and
       add one or more columns with the identified additional information to the spreadsheet, wherein one or more cells of the one or more columns comprise the identified additional information.

11. The system of claim 10, wherein to determine the entity type associated with the column, the processing device is further to:
  identify one or more entities associated with the data of each cell in the column, wherein each entity has an entity type;
  determine one or more commonly shared entity types for the column based on a number of cells in the column that share an entity type, wherein the number of cells satisfies a threshold condition; and
  identify a commonly shared entity type that has a highest number of cells that share the commonly shared entity type.

12. The system of claim 11, wherein to identify one or more entities associated with the data of each cell in the column the processing device is further to identify one or more entities from a knowledge graph comprising a knowledge base having structured information about a plurality of entities and relational connections between the entities.

13. The system of claim 12, wherein the processing device is further to:
  annotate metadata associated with the column based on the semantic meaning of the column,
  wherein the annotation to the metadata is is based on a node in the knowledge graph, wherein the node represents an entity of the one or more entities associated with data in the cell and that is associated with the semantic meaning of the column.

14. The system of claim 13, wherein to identify one or more additional entity types that are closely related to the entity type associated with the column, the processing device is further to:
  train, using machine learning, a model to assign a score to each entity type in the knowledge graph;
  provide the entity type associated with the column as input to a machine learning model trained using training data including collected historical data;
  obtain an output of the trained machine learning model, the output indicating a score for each additional entity type; and
  identify the one or more additional entity types that have a score that satisfies a second threshold condition.

15. The system of claim 13, wherein to identify one or more additional entity types that are closely related to the entity type associated with the column, the processing device is further to:
  identify a rule corresponding to the entity type associated with the column;
  determine, based on the rule, a subset of additional entity types pertaining to the entity type associated with the column, and a score for each additional entity type in the subset; and
  identify one or more additional entity types with a score that satisfies a second threshold condition in the determined subset of additional entity types.

16. The system of claim 10, wherein to add one or more columns with the identified additional information to the spreadsheet, the processing device is further to:
  provide a recommendation to the user based on the identified additional information; and
  responsive to receiving a user selection, add the identified additional information to the spreadsheet.

17. The system of claim 10, wherein to identify additional information that is relevant to the entity type associated with the column, the processing device is further to:
  identify one or more additional entity types that are closely related to the entity type associated with the column;
  identify one or more additional entities in a knowledge graph comprising a knowledge base having structured information about a plurality of entities and relational connections between the entities, wherein the additional entities are associated with the one or more identified additional entity types; and identify data in the one or more identified additional entities.

18. A non-transitory machine-readable storage medium comprising instructions that cause a processing device to perform operations to generate a chart recommendation based on machine understanding of spreadsheet data, the operations comprising:
  determining a set of data that each include content of a cell of one or more cells in a column of a spreadsheet presented to a plurality of users of a plurality of user devices;
  adding an annotation to metadata of the cell in the column, wherein the annotation is associated with an entity representing a semantic meaning of data in the cell;
  determining, based on the annotation, an entity type associated with the column, the entity type representing a semantic meaning of the set of data in the column of the spreadsheet;
  identifying one or more charts of a plurality of charts relevant to the entity type associated with the column; and
  providing the one or more identified charts for concurrent presentation to the plurality of users.

19. The non-transitory machine-readable storage medium of claim 18, wherein determining the entity type associated with the column comprises:
  identifying one or more entities associated with the data of each cell in the column, wherein each entity has an entity type;
  determining one or more commonly shared entity types for the column based on a number of cells in the column that share an entity type, wherein the number of cells satisfies a threshold condition; and
  identifying a commonly shared entity type that has a highest number of cells that share the commonly shared entity type.

20. The non-transitory machine-readable storage medium of claim 19, wherein identifying one or more entities associated with the data of each cell in the column comprises identifying one or more entities from a knowledge graph comprising a knowledge base having structured information about a plurality of entities and relational connections between the entities.

21. The non-transitory machine-readable storage medium of claim 20, wherein the annotation to the metadata is based on a node on the knowledge graph, wherein the node represents the entity of the one or more entities associated with data in the cell and that is associated with the semantic meaning of the column.

22. The non-transitory machine-readable storage medium of claim 18, wherein identifying one or more of the plurality of charts relevant to the entity type associated with the column comprises:
  training, using machine learning, a model to assign a score to each chart of the plurality of charts based on entity types in a knowledge graph;

providing the entity type associated with the column as input to a machine learning model trained using training data including collected historical data;

obtaining an output of the trained machine learning model, the output indicating a score for each of the plurality of charts for the column; and identifying one or more charts that have a score that satisfies a threshold condition.

23. The non-transitory machine-readable storage medium of claim 18, wherein identifying one or more of the plurality of charts that is relevant to the entity type associated with the column comprises:

identifying a rule corresponding to the entity type associated with the column;

determining, based on the rule, a subset of the plurality of charts pertaining to the entity type associated with the column, and a score for each chart in the subset; and identifying one or more charts with a score that satisfies a threshold condition in the determined subset of charts.

24. The non-transitory machine-readable storage medium of claim 18, wherein providing the one or more identified charts for presentation to the user comprises:

providing a recommendation to the user based on the identified charts;

receiving a user selection associated with one of the identified charts; and responsive to receiving the user selection, providing the selected chart for presentation to the user.

25. The non-transitory machine-readable storage medium of claim 18, further comprising annotating metadata associated with the column based on the semantic meaning of the column.

26. The non-transitory machine-readable storage medium of claim 18, wherein identifying one or more of the plurality of charts relevant to the entity type associated with the column comprises:

determining a score for each chart in the plurality of charts based on a set of rules associated with the semantic meaning of the column; and identifying the one or more charts that have a score that satisfies a threshold condition.

* * * * *